Nov. 9, 1954

R. C. SCOTT 2,693,698

HARDNESS TESTER

Filed Feb. 23, 1952

6 Sheets-Sheet 1

*INVENTOR.*
ROBERT C. SCOTT
BY
Kenway, Jenney, Witter & Hildreth
ATTORNEYS

Nov. 9, 1954

R. C. SCOTT 2,693,698

HARDNESS TESTER

Filed Feb. 23, 1952

6 Sheets-Sheet 3

INVENTOR.
ROBERT C. SCOTT

BY

ATTORNEYS

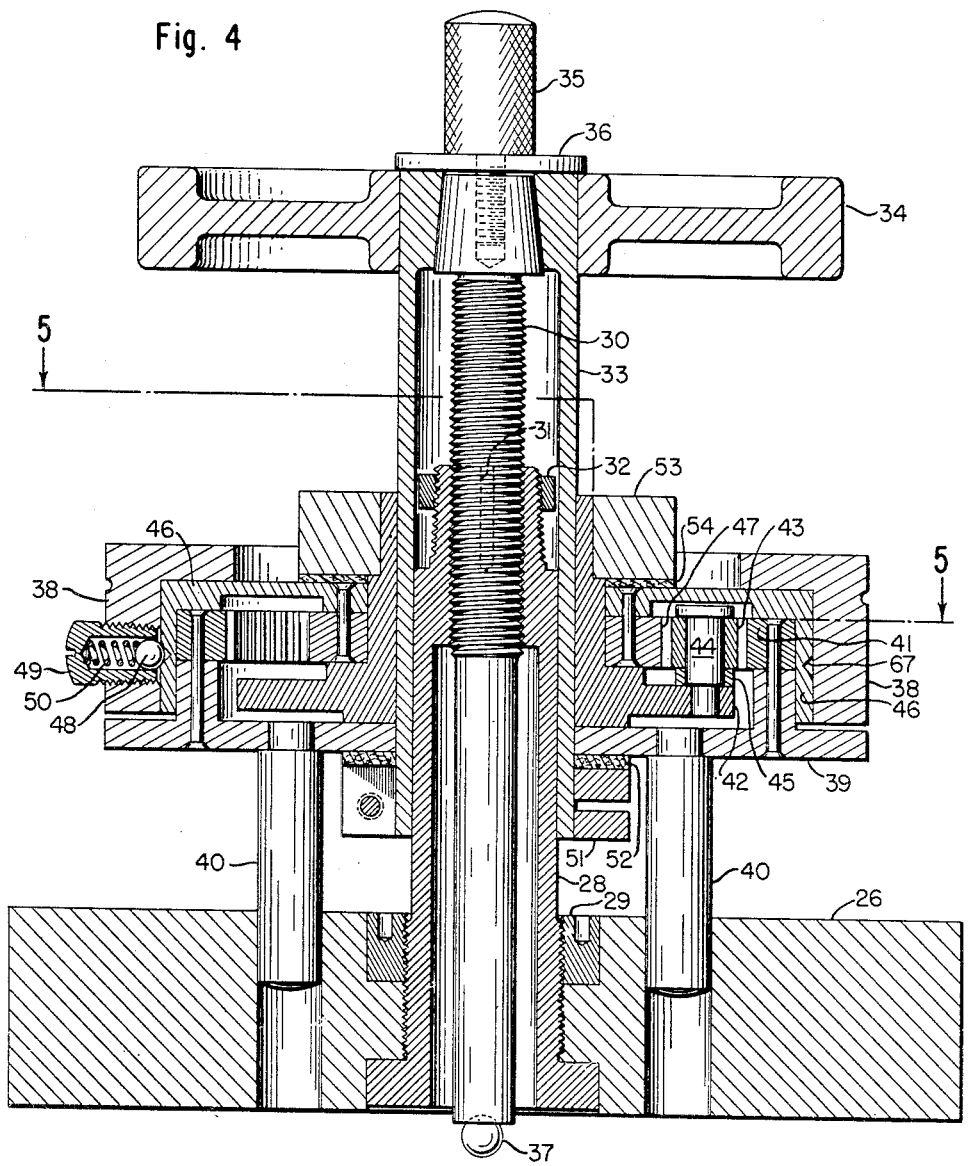

Nov. 9, 1954  R. C. SCOTT  2,693,698
HARDNESS TESTER
Filed Feb. 23, 1952  6 Sheets-Sheet 5
Fig. 5
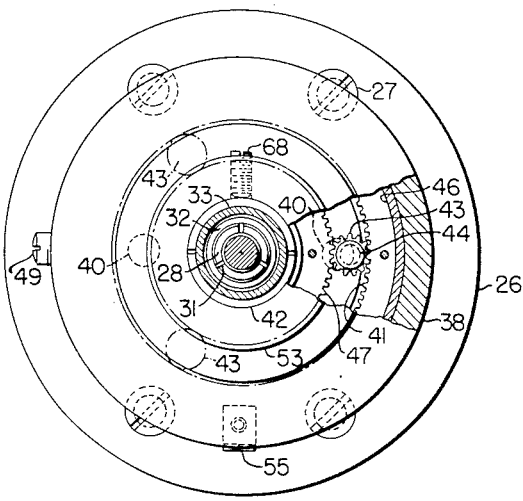
Fig. 6
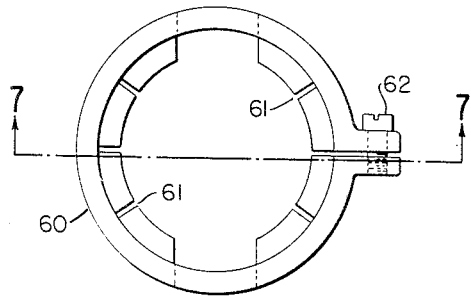
Fig. 10
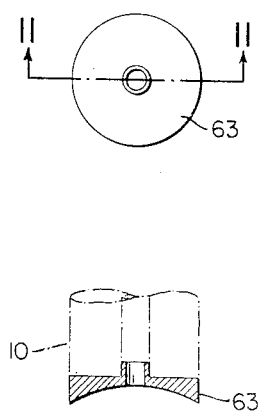
Fig. 11
Fig. 7
*INVENTOR.*
ROBERT C. SCOTT
BY
Kenway, Jenney, Witter & Hildreth
ATTORNEYS

INVENTOR.
ROBERT C. SCOTT
ATTORNEYS

United States Patent Office 2,693,698
Patented Nov. 9, 1954

2,693,698

HARDNESS TESTER

Robert C. Scott, Belmont, Mass.

Application February 23, 1952, Serial No. 272,981

7 Claims. (Cl. 73—83)

This invention relates to machines for testing the hardness of materials, especially metals and has among its objects to provide a portable hardness testing machine that is especially adapted to test hardness of ferromagnetic work pieces having variously formed surfaces, that can be affixed and firmly withheld to the work during the making of hardness tests by electromagnetic means, that demagnetizes the work after the making of hardness tests by electromagnetic means, that is electromagnetically operative from a small self-contained battery and/or from alternating current power mains, that is extremely durable, rapid and accurate in operation upon the softer as well as the harder ferromagnetic materials, that does not mar or destroy the work being tested, and that is operable in any position without impairment of its accuracy.

A feature of this invention is that the electromagnet which holds the hardness tester to the work, has inner and outer cores so arranged that the magnetic circuit flows between the inner and outer cores through the work being tested, which acts as an armature for the electromagnet.

Another feature of this invention is that the magnetic circuit is balanced in three dimensions, with the penetrator at the geometric center of the balanced circuit.

Another feature of this invention is that the point of contact between the penetrator and work has minimum flux density.

Another object of this invention is to provide a magnetic circuit in a hardness tester, including inner and outer magnetic cores, and the work being tested.

Another object of the invention is to increase the efficiency of a magnetic circuit which holds a hardness tester to the work piece being tested.

Figure 1:
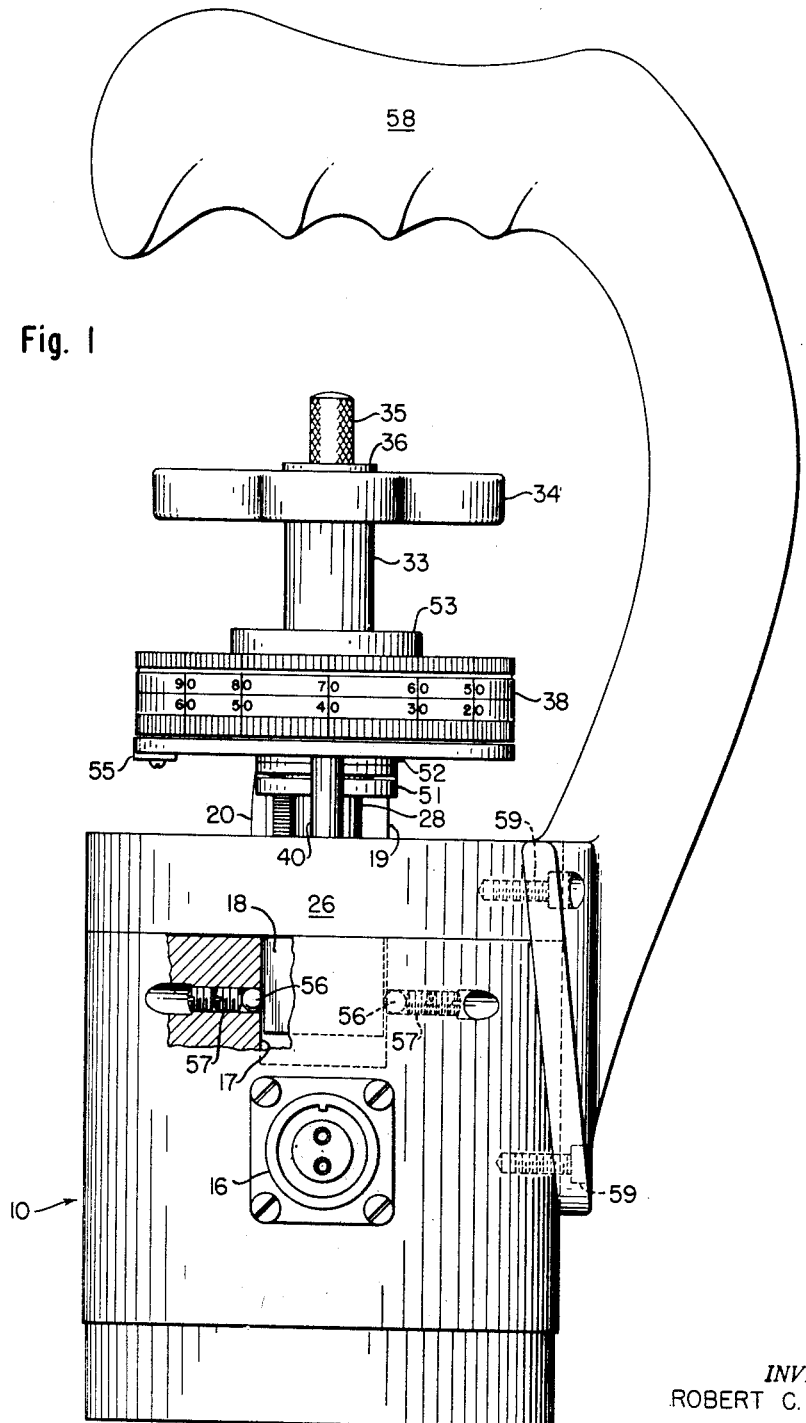
Figure 2:
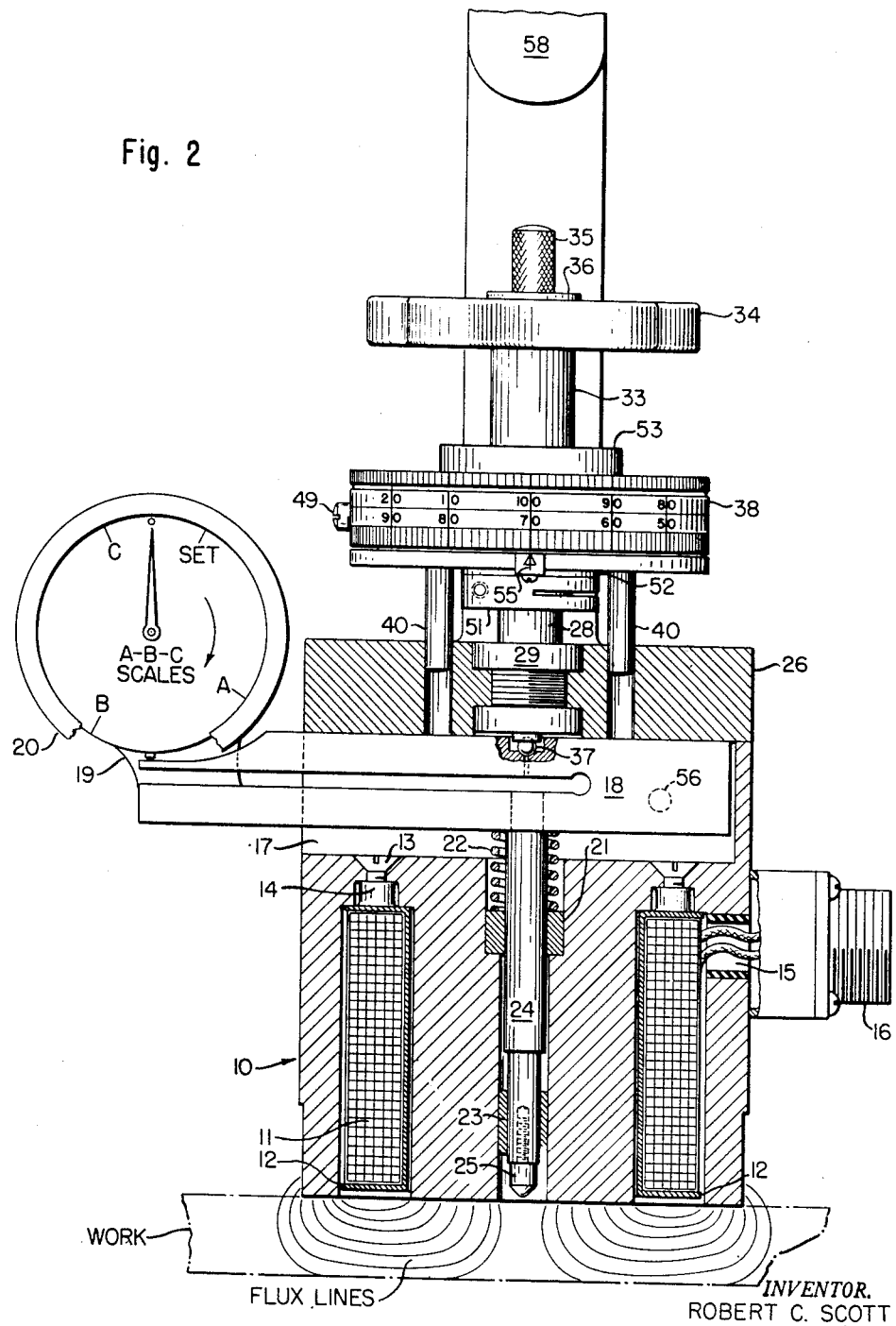
Figure 3:
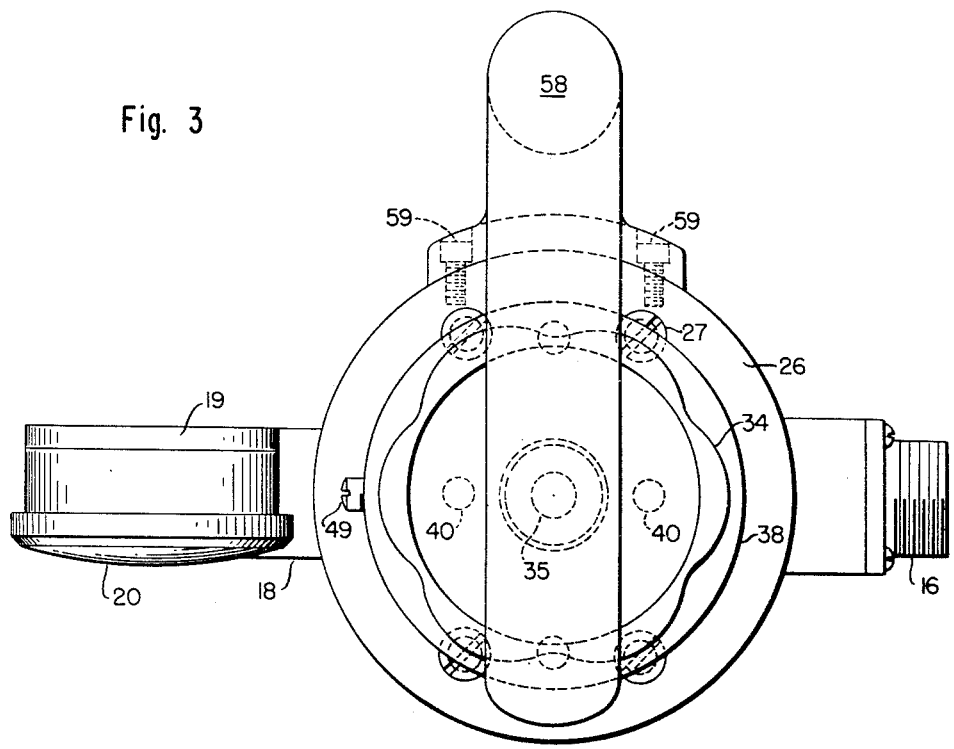
Figure 9:
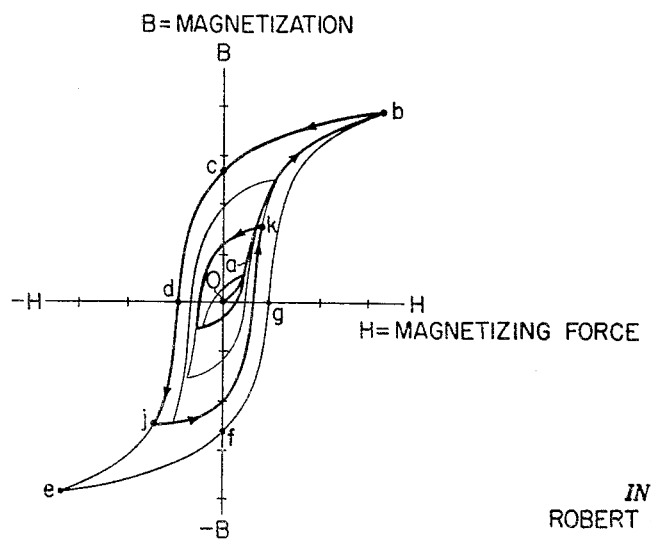
Figure 8:
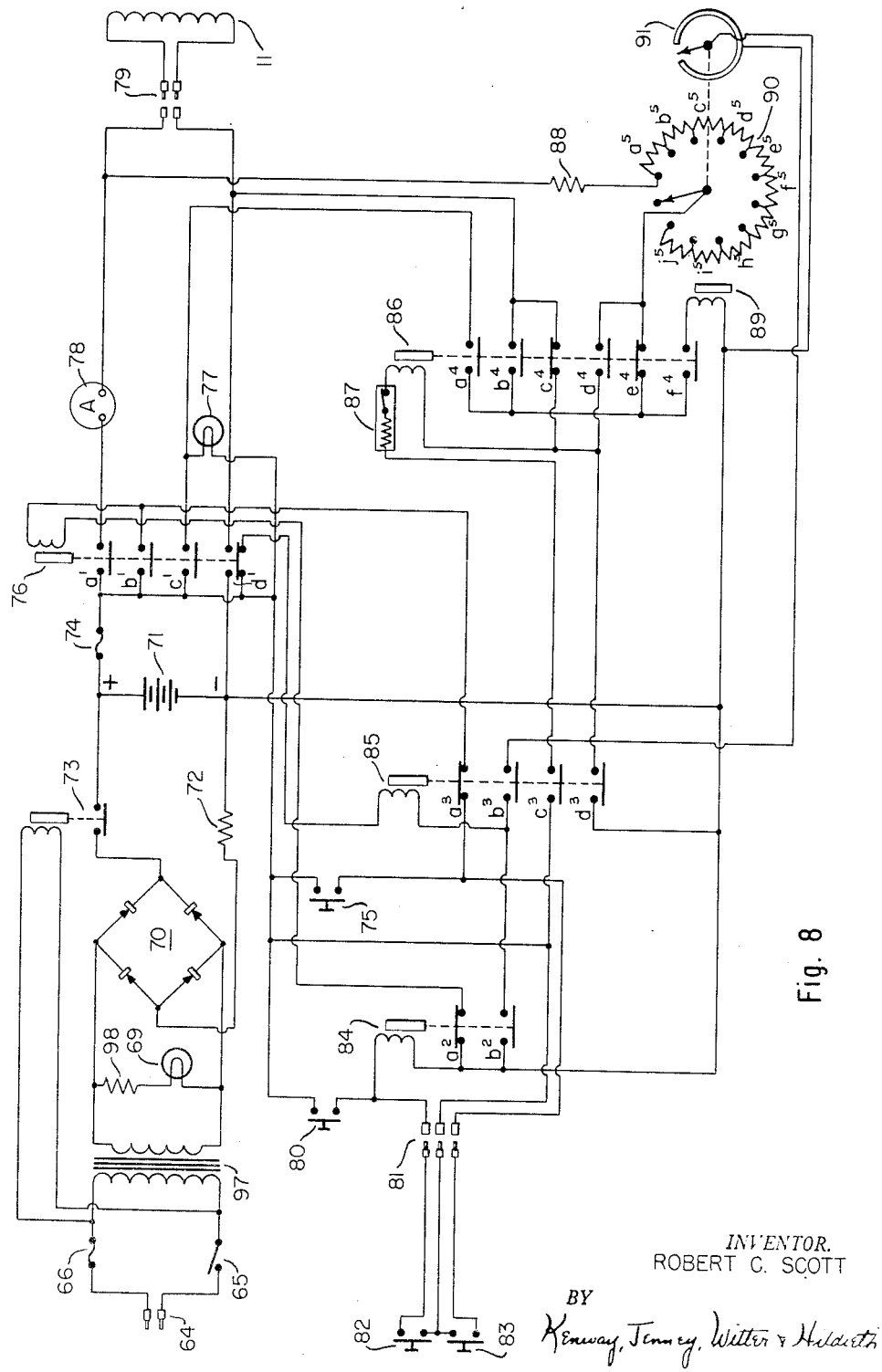

My invention will now be described with reference to the drawings, of which:

Fig. 1 is a view in side elevation of one embodiment of my improved machine,

Fig. 2 is a sectional elevation through the machine, on a plane passing through the axis of the penetrator testing rod, applied to a work surface, the flux lines through the work and inner and outer cores of the electromagnet being illustrated, Fig. 3 is a top plan view of the machine, Fig. 4 is an enlarged vertical section illustrating what may be termed the barrel dial mechanism disposed at the top of the machine, Fig. 5 is an enlarged sectional plan of the barrel dial mechanism, the section being taken on the line 5—5 of Fig. 4, Fig. 6 is a plan view of what may be termed a shoe adapter, for use when making hardness tests of work whose surface is other than plane, Fig. 7 is a sectional view of the shoe adapter taken on the line 2—2, Fig. 8 is a schematic diagram showing in symbolic form the source of electrical supply and the electrical circuits and means for controlling the operation of the electromagnet, Fig. 9 is a graph of a hysteresis loop that illustrates important magnetic properties of ferromagnetic materials, and which is included to aid in describing the electromagnetic means provided for the operation of the hardness testing machine, Fig. 10 is a broken plan view of a center core shoe adapter which may be used with the outer core shoe adapter where the curvature of the work surface is relatively small, and Fig. 11 is a sectional view along the line 11—11 of Fig. 10.

An improved machine that has been developed by me and found to work satisfactorily is illustrated in the drawings herein, and comprises an electromagnet 10 which magnetically affixes, and firmly retains the hardness tester on the surface of the ferromagnetic work the hardness of which is to be measured. The electromagnet is of the circular flat-faced armature type which is characterized by having an annular recess that contains the magnetizing and demagnetizing coil 11, and concentric magnetic poles of opposite polarity, thus providing a balanced magnetic circuit of relatively short length and large sectional area, with two working air gaps. The air gaps, magnetically in series are mechanically in parallel, and provide a holding surface of large effective area with optimum lifting or withholding force. The entire magnetic circuit comprises the pole core (inner), pole core (outer), yoke and armature. The ferromagnetic work being tested acts as the magnet armature, and thus forms part of the magnetic circuit when the magnetizing and demagnetizing coil is energized from a source of electrical supply. The flux lines in this magnetic circuit are shown at the bottom of Fig. 2, and if seen in a bottom plan view, would be radial.

The magnet structure (yoke and pole cores), is preferably made from a solid piece of soft iron or from low content carbon steel or its equivalent, suitably annealed after machining to provide high magnetic saturation and consequently high magnetic force, and to have low magnetic retentiveness and coercive force for facilitating demagnetization and removal of the hardness testing machine from the surface of the work after making hardness tests. The magnetizing and demagnetizing coil is preferably energized by direct current which may be supplied from a battery, or from rectified alternating current; hence the preferred electromagnet is of the direct current type.

The magnetizing and demagnetizing coil is wound on a bobbin 12 which is held in position by flat-head machine screws 13 that are screwed into bosses 14 connected to the upper bobbin flange. The ends of the magnetizing and demagnetizing coil are brought out through a bushed hole 15 in the side of the outer pole core, and connect to contacts within cable connector 16, which is mounted on a riser block and fastened to the outer surface of the pole core. A flexible two conductor cable of suitable length (shown diagrammatically only in Fig. 8), connects the magnetizing and demagnetizing coil to the source of electrical supply, and to means for controlling and operating the electromagnet, which are contained within a separate portable carrying case.

A recess 17 is milled in the top of the electromagnet yoke to provide clearance space for load spring 18, which I prefer to make of nonmagnetic steel, and which is longitudinally slotted to form a compression type of hairpin spring with upper and lower sections. At the outer end of the load spring a mounting pad 19 is securely fastened to the lower section, allowing clearance space between the pad and the upper spring section. A sensitive dial indicator 20 is securely fastened to the mounting pad, with a spring loaded indicator spindle resting firmly on the upper section of the load spring, and so arranged that the slightest flexure of the load spring will cause the pointer to turn and thus be indicated on the dial.

A hole through the center of the inner pole core is counterbored at its upper end to accommodate a press-fitted bronze bushing 21 and a nonmagnetic spiral spring 22. Toward the face of the electromagnet a second bronze bushing 23 is press-fitted within the center hole. A penetrator extension rod 24, which I prefer also to make of nonmagnetic steel, is press-fitted into the lower section of load spring 18. The penetrator extension rod and load spring assembly is centered and guided by bushings 21 and 23 which are precision aligned and reamed to provide a sliding fit for the penetrator extension rod. The lower end of the penetrator extension rod is threaded to take penetrator 25 which indents the work during the making of a hardness test, and which may be readily removed and replaced from the face of the electromagnet.

The penetrator or indentor may alternatively be a conically shaped diamond, a steel ball, or some other type of indenting tool. A cylindrical cap 26, which I prefer to make of soft iron or mild steel, is secured to the top of the magnet yoke by cap screws 27. In the center of the cap, and on the center line of the penetrator extension rod, an inner supporting tube 28 is firmly secured by means of its flanged end and nut 29. The top end of the supporting tube is threaded on the inside to accommodate a threaded load spindle 30. The top of the inner supporting tube 28 is reduced in diameter and has three equally spaced longitudinal slots 31, and a tapered external thread to accommodate the nut 32 which also has a tapered thread, so that wear on the inside thread of the supporting tube 28 or on the spindle thread 30 may be compensated for by turning the nut, thus compressing the top threaded section of the supporting tube. An outer tube 33 which has a sliding fit over the inner tube 28 is press-fitted into a load handwheel 34. The inside of the outer tube 33 and the load spindle 30 are tapered on their top ends, and by means of a knurled screw 35 and washer 36 the load spindle is firmly held concentric with the outer tube 33. The lower end of the load spindle 30 is work-hardened and seated to conform to the contour of a hardened steel ball 37. The upper section of load spring 18 is counterbored and also work-hardened and seated to conform to the contour of hardened steel ball 37, so that the load spring 18 is interposed between the load spindle 30 and the penetrator extension rod 24 which are on a common center line.

By turning the load handwheel in a clockwise direction, the load member assembly (which comprises the load spring 18, dial indicator 20, penetrator extension rod 24 and penetrator 25), will be moved downward in the vertical direction, and at first resisted only by the load member return spring 22. Then when motion of the penetrator is resisted, as when the hardness tester is magnetically affixed to work that is being hardness tested, the load spring 18 will be compressed an amount which will be indicated by the pointer on the dial indicator, and the motion of the pointer will be proportional to the applied load. By turning the load handwheel in a counterclockwise direction the load member return spring will move the load member assembly upward, after the testing load has been removed as shown on the dial indicator.

The barrel dial 38 is arranged to rotate in the same direction as the load handwheel but through a greater angle, to provide for optimum spacing of the hardness scales that are engraved on the face of the barrel dial. Hence, for approximately one-third revolution of the load handwheel, which is required between minor and major loading during the making of hardness tests, the barrel dial is made to rotate approximately one revolution, thus providing for greater spacing between hardness numbers and consequently greater accuracy in determining hardness. The means by which this is accomplished consists of a planetary gearing mechanism, wherein a base plate 39 which is concentric with outer tube 33 is prevented from rotating by guide pins 40. An internal gear 41 which is fastened to base plate 39, preferably by rivets suitably spaced, is concentric with the outer tube 33. Concentric also with the outer tube 33 is a spider 42 on which are mounted by means of press-fitted studs 44 and washers 45, three small equally spaced spur gears 43 that mesh with internal gear 41. Concentric with the spider 42 is the inner drum 46 to which is fastened, preferably by rivets suitably spaced, a spur gear 47 which meshes with the three small spur gears 43. The barrel dial 38 fits over the inner drum 46, and is free to turn on the inner drum by finger pressure on the knurled edge of the barrel dial, but otherwise turns with the inner drum during the making of hardness tests without slippage between the two. To accomplish this, a groove 67 is provided on the face of the inner drum, which acts as a ball race for steel ball 48. Retaining stud 49 is screwed through the face of the barrel dial 38, between the beginning and end of the barrel dial scales, and contains the steel ball 48 as well as a spiral spring 50 which exerts pressure on the steel ball to withhold the barrel dial in position, and also to prevent the barrel dial from slipping or accidentally turning relative to the inner drum during the making of hardness tests.

The lower collar 51 is secured to and turns with the outer tube 33, and the washer 52 minimizes frictional wear between the lower collar and the nonrotating base plate 39. The top end of the spider 42 has two equally spaced saw slots, and by tightening the set screw 68 (Fig. 5) in the upper collar 53, the spider is secured to and turns with the outer tube 33. The washer 54 minimizes frictional wear between the upper collar 53 and the inner drum 46 which turn at different speeds.

By turning the handwheel 34 in a clockwise direction, the load spindle 30 and the outer tube 33 will rotate accordingly and traverse in a downward vertical direction, moving also vertically downward the entire barrel dial mechanism assembly. Also, the spider 42 will rotate with the outer tube 33, causing the three small spur gears 43 that mesh with the nonrotating inside gear 41 to rotate and turn the larger spur gear 47 which is secured to the inner drum 46. Hence, the three small spur gears are the drivers and the large spur gear the driven; and by choosing suitable gear ratios, the inner drum and consequently the barrel dial can be made to turn at a greater speed (or through a greater angle), than the load handwheel, and in the same direction as the load handwheel. A pointer 55 comprising an angle shaped member, on the front side of which is engraved a fine line, is fastened to the underside of the nonrotating base plate 39 and acts as a reference line for the "set" position of the barrel dial, and for indicating hardness readings on the barrel dial scales. The load spring 18 is prevented from rotative movement by two hardened steel balls 56, one on each side, that are retained in position by double set screws 57. A light-weight aluminum handle, 58, shaped to provide a firm hand grip, is secured to the outer pole core and cap by flush head machine screws 59.

The electromagnet is designed to provide a lifting or withholding force between the face of the magnet and the surface of the work the hardness of which is to be measured, of sufficient magnitude to adequately resist the maximum opposing force of the penetrator so that there is no motion whatever between the face of the magnet and the surface of the work, even though the surface of the work is relatively rough and irregular. If, however, the surface of the work is curved or other than approximately plane, a shoe adapter 60 may be secured to the lower outer surface of the outer pole core of the electromagnet as shown in Figs. 6 and 7, thus providing a relatively small cumulative air gap between the face of the electromagnet and the surface of the work, and a relatively small increase in the overall length of the magnetic circuit, but with a relatively large increase in the effective holding area of the electromagnet; hence the lifting or withholding force of the electromagnet will be substantially the same as when used on a flat or plane surface, and therefore adequate to resist the maximum opposing force of the hardness penetrator. The shoe adapter is made of soft iron, slowly annealed after machining, or its equivalent, and is shaped to conform to the contour of the work to be tested. Saw slots 61 are suitably spaced around the inner shoulder on which the outer pole core rests, to allow for flexing and clamping of the shoe adapter, which is secured to the outer pole core surface of the magnet structure by clamping screw 62. If the curvature of the work is relatively small, a center core shoe adapter 63 (Figs. 10 and 11) may also be used in conjunction with the outer core shoe adapter, to reduce the air gap between the face of the inner pole core of the electromagnet and the face of the work. If a center core shoe adapter is used, an extension is provided between the penetrator extension rod 24 and the penetrator 25 to compensate for the increase in effective length of the center pole core. It will thus be apparent that shoes can be provided to fit any contour, whether it be concave, convex or of irregular shape.

A graph showing how the degree of magnetization varies with the magnetizing force (for one kind of ferromagnetic material), is given in Fig. 9 wherein H, —H represent the magnetizing force and B, —B represent the magnetization. Starting with the material completely unmagnetized, which is represented by the point "O," the material passes through the state "a" where the magnetization increases very rapidly with increase of the magnetizing force, to saturation at "b" where further magnetization of the material is negligible for further increase of the magnetizing force. Decreasing the magnetizing force to zero, the material is left with a degree of magnetization represented by the ordinate "Oc" which is a measure of the "retentiveness" of the material. Reversing the direction of the magnetizing force and increasing its magnitude brings the material to the state "d" in which it has completely lost its magnetization, and finally to the condition "e" of saturation in the opposite sense to that previously existing. The magnetizing force necessary to completely demagnetize the material represented by the abscissa "Od," is referred to as the coercive force. Continuation of the process takes the material through the points "f" and "g" and back to "b." The lagging of the magnetization of the material behind the magnetizing force illustrated by the curve is known as hysteresis, and the curve is commonly known as a hysteresis loop. Hysteresis loops reveal considerable information regarding the magnetic characteristics of ferromagnetic materials, and differ widely for different materials. In some materials such as soft iron the retentiveness and coercive force are relatively low; in other materials such as high carbon steels and certain alloy steels the retentiveness and coercive force are relatively high. As previously stated, the work whose hardness is to be measured acts as the armature for the electromagnet, and is thus a part of the magnetic circuit; and since the hardness tester will be used for testing the hardness of all kinds of ferromagnetic materials, the retentiveness and coercive force of the materials will vary from relatively low to relatively high. If, therefore, the retentiveness of the work is relatively high, its residual magnetism may be of sufficient magnitude to require considerable mechanical force to remove the hardness tester from the work after the energizing circuit of the magnetizing coil is opened. Furthermore, even after the hardness tester is removed, the work will still retain its residual magnetism, which in many cases could not be tolerated. Therefore, demagnetization of the work after its hardness has been tested and before attempting to remove the hardness tester from the surface of the work is desirable, and in many cases essential. One method of demagnetization is by energizing the magnetizing and demagnetizing coil with alternating current of suitable value, and then continuously diminishing its magnitude, thus producing a hysteresis loop that becomes smaller and smaller until it finally vanishes, leaving the material demagnetized. Demagnetization of the work may also be accomplished by using direct current and reversing its polarity to simulate the results obtainable from the use of alternating current. To illustrate the manner in which demagnetization may be accomplished by using direct current, reference is again made to Fig. 9. Assume that the degree of magnetization reached when the magnetizing and demagnetizing coil is energized by direct current is represented by the point "b," and that the retentiveness or residual magnetism of the work is represented by the ordinate "Oc" if the coil is deenergized by opening its circuit. If then, the magnitude of the current is reduced by inserting a suitable value of resistance in the circuit and the magnet coil energized in the opposite sense by reversing the polarity of the energizing current, the degree of magnetization reached will be represented by some point such as "j" except that it will be of opposite magnetic polarity to that previously existing. If the magnetizing coil is again deenergized by opening its circuit and the magnitude of the current again reduced and reversed through the coil, the degree of magnetization reached will then be represented by some point such as "k." If this cyclic procedure of reducing and reversing the current through the magnetizing coil is continued, the hysteresis loop will approximate that shown in Fig. 9 and will become smaller and smaller. Hence, the degree of demagnetization of the work may be reduced to any desired value by using a suitable number of incremental reductions and reversals of direct current through the magnetizing and demagnetizing coil.

The source of electric supply and means for controlling and operating the electromagnet during the making of hardness tests and the demagnetization of the work after the hardness tests are made, are contained within a separate portable carrying case, and are shown diagrammatically in the deenergized position and in smybolic form in Fig. 8, wherein 64 is an electrical receptacle for connecting the circuiting and means to an alternating current power system mains, 65 is a single-pole switch, 66 is a fuse for protecting the circuiting against alternating current overloads as well as defective or improper operation, and 97 is a transformer to reduce the voltage of the alternating current to a suitable working value, and to isolate the circuiting from the power system. A resistor 98 with pilot light 69 is connected across the low voltage or secondary winding of the transformer to indicate when the alternating current supply is on. The transformed alternating current supply is rectified by a full-wave, bridge-connected rectifier 70 (which preferably is of the dry plate type), and which is connected to a light-weight portable storage battery 71 through a current limiting resistor 72 and relay 73. The relay coil is connected across the high voltage side or primary of the transformer and arranged to close the circuit to the storage battery only when the alternating current is switched on. When the alternating current is switched off, the relay contacts open the circuit to the battery to prevent current drain on the battery through the "back" resistance of the rectifier. The storage battery is thus the principal source of electrical supply for the control and operation of the electromagnet, and has sufficient capacity to operate the hardness testing machine for an extended period of time without aid from the alternating current supply. Thus, the alternating current supply charges the battery, and also acts as a booster in the event the battery voltage becomes reduced in value during the making of hardness tests.

The battery is protected against overloads as well as defective or improper operation by the fuse 74. Magnetizing switch 75 is of the momentary contact push-button type, and 76 is a four-pole relay shown in the deenergized position, with bridging contacts $a^1$, $b^1$, $c^1$ and $d^1$. A red pilot light 77 indicates when the electromagnet is energized, and flashes in an "on-off" sequence during the demagnetizing cycle. The ammeter 78 indicates current input to the magnetizing and demagnetizing coil of the electromagnet when the coil is magnetized as when making hardness tests, but not during the demagnetizing cycle. A two-conductor cable with plugs and receptacles 79 connects the source of electrical supply to the magnetizing and demagnetizing coil 11 of the hardness-testing machine. Demagnetizing switch 80 is also of the momentary contact push-button type. A three-conductor cable with plugs and receptacles 81 and magnetizing and demagnetizing momentary contact push-button switches 82 and 83 respectively, are provided for controlling the electromagnet at a distance from the portable carrying case which contains the control means and the source of electrical supply.

Relay 84 with bridging contacts $a^2$ and $b^2$ is momentarily energized and operative when one of the demagnetizing switches is closed. The relay 85 with bridging contacts $a^3$, $b^3$, $c^3$ and $d^3$ is energized only during the period of the demagnetizing cycle. Also, the relay 86 with bridging contacts $a^4$, $b^4$, $c^4$, $d^4$, $e^4$ and $f^4$ is cyclically energized and deenergized during the demagnetizing cycle by a contact making and breaking thermostatic device 87 which is in series with and operated by the current input to the operating coil of relay 86. A current limiting resistor 88 and a magnetically operated rotary switch with component parts 89, 90 and 91 are shown in the neutral or off position and are operative only during the demagnetizing cycle. The magnet 89 when energized, moves the contact arms of the rotary switch 90 and the commutator 91 (mounted on a common shaft), in a clockwise direction to the adjacent switch contact position. The arm of the rotary switch makes contact with the adjacent contact position before breaking contact with the previous contact position. When the coil is deenergized the contact arms are restrained from moving by a ratchet device forming part of the rotary switch assembly. Resistors $a^5$ to $j^5$ of suitable values are connected in series and to the switch contacts, so that as the switch arm is progressively moved to adjacent contacts, an increasing value of resistance will be inserted in the demagnetizing circuit.

In making a hardness test, all paint, scale or other surface deposits should be removed from the work in the area to be tested. The face of the electromagnet, or of the shoe adapters 60 and/or 63 if used, should approximately fit the surface of the work to assure a good magnetic circuit with a relatively small air gap between the electromagnet and the work. By momentarily depressing push-buttons 75 or 82 the coil of relay 76 will be energized and thereby close bridging contacts, $a^1$, $b^1$, $c^1$, and $d^1$, which will energize magnetizing and demagnetizing coil 11, by closure of bridging contacts $a^1$ and $d^1$, and thus magnetically affixes and secures the hardness tester to the surface of the work. Closure of the bridging contact $b^1$ will by-pass or "shunt" push-buttons 75 and 82, so that relay 76 will remain energized after push-button 75 or 82 is released to the open position. Furthermore, closure of bridging contact $c^1$ will switch the pilot light 77 into circuit to indicate that the electromagnet is energized.

After the hardness tester is firmly affixed and held magnetically to the work, the "dot" on the face of the dial indicator should be turned to coincide with the position of the dial pointer, by turning the dial face of the indicator, to assure no-load calibration of the dial indicator. The load handwheel 34 is then turned in a clockwise direction until the penetrator (or indentor) is resisted by the work and the pointer on the dial indicator coincides with the line on the dial face marked SET. The force or load thus applied by the penetrator to the surface of the work is generally referred to as the "minor" load, and because of surface imperfections in the work represents a fixed base or starting point for the hardness readings. The barrel dial 38 is then turned by hand until a point, marked "0" on the scales coincides with the refernce line on the fixed pointer 55. Then the load handwheel is again turned in a clockwise direction, the barrel dial turning accordingly except through a greater relative angle, until the pointer on the dial indicator coincides with one of the lines on the dial, marked A, B or C, depending upon the kind of penetrator used, which is determined by the relative softness of the work being tested; the load thus applied represents what is generally referred to as the "major" load. The load handwheel is immediately thereafter turned in a counterclockwise direction, back to where the pointer of the dial indicator coincides with the line on the dial marked SET. The appropriate scale reading on the barrel dial that coincides with the reference line on the fixed pointer then gives the hardness number of the work being tested, either directly or by a conversion table or chart, depending upon the type of penetrator and the loading used in making the test. After noting the hardness number, the load handwheel is turned further in the counter-clockwise direction to remove the penetrator from the surface of the work as indicated by the pointer on the dial indicator which will return to its no-load position, and coincide with the dot or zero position on the face of the dial.

Before attempting to remove the hardness tester, the work is demagnetized by depressing push-button 80 or 83, thereby causing the operating coil of relay 84 to become energized, causing bridging contact $a^2$ to open, and bridging contact $b^2$ to close. The opening of bridging contact $a^2$ will deenergize the operating coil of the relay 76, causing bridging contacts $a^1$, $b^1$, $c^1$ and $d^1$ to open their respective circuits, but in so doing bridging contact $d^1$ energizes the coil of the relay 85, thus opening its bridging contact $a^3$ and closing its bridging contacts $b^3$, $c^3$, and $d^3$. Closure of bridging contacts $c^3$ and $d^3$ energizes the operating coil of the relay 86 which closes its bridging contacts $a^4$, $b^4$, $d^4$ and $f^4$ and opens its bridging contacts $c^4$ and $e^4$. This causes magnet 89 to be energized which moves the arm of the rotary switch 90 to an adjacent switch position and the arm of the commutator 91 to make electrical contact with its commutator ring, thus closing the operating coil circuit of the relay 85 through its bridging contact $b^3$ and thereby bypassing or shunting push-buttons 80 and 83 which, when released, will deenergize the coil of the relay 84 thus returning its bridging contacts $a^2$ and $b^2$ to their original deenergized position as shown in Fig. 8.

Closure of bridging contacts $b^4$ and $d^4$ of the relay 86 will energize the magnetizing and demagnetizing coil 11 except that the polarity will be reversed, and the current through the magnetizing and demagnetizing coil will be reduced in value by means of the resistor 88. After a relatively short period of time the current through the coil of the relay 86 will cause the contacts of the thermostatic device 87 to open, thus opening the coil circuit of the relay 86 and causing its bridging contacts to return to the deenergized position whereby the magnet coil 89 will be deenergized, the circuit of the pilot light 77 will be opened and the polarity of the current input to the magnetizing and demagnetizing coil 11 will be again reversed. After a period of time during which the operating coil of relay 86 is deenergized, the thermostatic device 87 closes its contacts and the operating coil of the relay 86 is again energized. The cycle of operation is the same as before, except that additional resistance is inserted in the magnetizing and demagnetizing coil circuit by motion of the arm of the rotary switch 90. The demagnetizing cycle of reversing and reducing the current to the magnetizing and demagnetizing coil is automatically repeated, until finally the arm of the rotary switch 90 and the arm of the commutator 91 reach their off positions as shown in Fig. 8, at which time the operating coil of relay 85 is deenergized, which causes the operating coil of the relay 86 to become deenergized, thus completing the demagnetizing cycle and permitting removal of the hardness tester from the demagnetized work.

Although I have submitted one specific embodiment of my invention for illustrative purposes, it is to be understood that I am not being limited thereby to its specific mechanical and electrical details or arrangement of parts and electrical connections, but that extensive deviations may be made therefrom without departing from the spirit of my invention as defined in the appended claims.

Having thus disclosed my invention, what I claim as new and desire to secure by Letters Patent is:

1. In a hardness tester for magnetizable metals, the combination comprising, an electro-magnetically energized element for holding a specimen to be tested, a specimen penetrator mounted upon and passing through said element, means mounted on said element for applying a load to said penetrator, load measuring means operatively connected to said last-named means for indicating the load applied to said penetrator; and penetration measuring means comprising an internal ring gear mounted in non-rotatable relation to said holding element, an intermediate pinion meshed with said ring gear and coupled for movement with said penetrator, an inner gear meshed with said pinion, and a barrel scale mounted for movement with said inner gear.

2. A tester for testing the hardness of magnetizable metals, comprising a magnetic holding element for a specimen to be tested, means including a coil for energizing said holding element, said holding element having an opening extending axially of said coil, a penetrator moving rod movable in said opening, a penetrator attached to one end of said rod, adjustable means mounted on said holding element for exerting thrust on the other end of said rod, means including a first indicator carried by a portion of said adjustable means for indicating the amount of thrust on said rod, means including a second indicator operatively connected to said adjustable means for indicating the depth of penetration of said penetrator, and means including a manually controlled switch operable after the hardness test is completed for supplying current to said coil periodically changing in direction and gradually decreasing in value.

3. A tester for testing the hardness of magnetizable metals comprising a magnetic holding element having a longitudinally extending opening therein, and having an annular recess concentric with said opening and forming spaced apart concentric, magnetic pole pieces for contacting the surface of a specimen to be tested; means including a coil provided in said recess for magnetizing said pole pieces, said pole pieces having opposite magnetic polarities, a penetrator for penetrating the surface of a specimen, a member attached to said penetrator and movable longitudinally in said opening, adjustable means including a flexible load spring mounted on said holding element for moving said member and penetrator against the surface of a specimen, an indicator carried by and responsive to movement of said spring for indicating the flexure of said load spring, a depth penetrating indicator actuated by the movement of said member for indicating the penetration of said penetrator, and means for supplying current to said coil periodically changing in direction and decreasing gradually in value for demagnetizing a ferromagnetic specimen in contact with said pole pieces.

4. In a hardness tester for magnetizable metals, the combination comprising, a generally cylindrical electro-magnetically energized element for holding a specimen to be tested, said element having an axially extending opening therein, specimen penetrating means movable in said opening, means mounted on said element for applying a load to said penetrating means, load measuring means mounted on a portion of said last-named means for indicating the load applied to said penetrating means;

and penetration measuring means, said measuring means comprising an internal ring gear mounted in non-rotatable relation to said holding element, an intermediate pinion meshed with said ring gear and coupled for movement with said penetrating means, an inner gear meshed with said pinion, and a barrel scale mounted for movement with said inner gear.

5. A tester as claimed in claim 4 in which the holding element has an annular recess around and concentric with said opening and providing spaced-apart annular magnetic pole pieces of opposite polarity.

6. A tester as claimed in claim 5 in which a coil for magnetizing said pole pieces is within said recess.

7. A tester as claimed in claim 6 in which means is provided for supplying current to said coil periodically changing in direction and gradually decreasing in value.

References Cited in the file of this patent

UNITED STATES PATENTS

| Number | Name | Date |
|---|---|---|
| 1,561,554 | Little | Nov. 17, 1925 |
| 2,187,240 | Karasick | Jan. 16, 1940 |
| 2,544,205 | Williams | Mar. 6, 1951 |
| 2,561,770 | Anderson | July 24, 1951 |

FOREIGN PATENTS

| Number | Country | Date |
|---|---|---|
| 617,458 | France | Nov. 20, 1926 |
| 993,071 | France | July 18, 1951 |